United States Patent [19]
Kawabata et al.

[11] Patent Number: 5,720,523
[45] Date of Patent: Feb. 24, 1998

[54] SEAT STRUCTURE FOR VEHICLES WITH OCCUPANT DETECTOR

[75] Inventors: Hideki Kawabata; Takami Terada, both of Toyota; Hiroshi Nawa, Kariya; Naofumi Fujie, Nagoya; Yasuaki Suzuki, Kariya, all of Japan

[73] Assignee: Aisin Seiki Kabushiki Kaisha, Kariya, Japan

[21] Appl. No.: 631,015

[22] Filed: Apr. 12, 1996

[30] Foreign Application Priority Data

Apr. 14, 1995 [JP] Japan ................... 7-089407
Nov. 20, 1995 [JP] Japan ................... 7-301792
Feb. 21, 1996 [JP] Japan ................... 8-034057

[51] Int. Cl.$^6$ ......................................... A47C 1/02
[52] U.S. Cl. .................. 297/338; 200/85 A; 340/667
[58] Field of Search ........................ 297/338, 217.3, 297/337; 180/273, 272; 340/425.5, 426, 430, 667; 200/85 A, 85 R

[56] References Cited

U.S. PATENT DOCUMENTS

| | | | |
|---|---|---|---|
| 3,703,618 | 11/1972 | Lewis | 200/85 R |
| 3,757,067 | 9/1973 | Eberle et al. | 200/85 A |
| 4,075,443 | 2/1978 | Fatur | 200/85 A |
| 4,361,741 | 11/1982 | Leskoverc et al. | 340/667 X |
| 5,124,512 | 6/1992 | Huettner et al. | 200/85 A |
| 5,481,078 | 1/1996 | Asche | 340/667 X |

Primary Examiner—Laurie K. Cranmer
Attorney, Agent, or Firm—Burns, Doane, Swecker & Mathis, LLP

[57] ABSTRACT

A seat structure is provided which can more reliably detect seating by a smaller stroke of a seat cushion. Movable members 8, 51 and 231 operating in response to up and down movement of a seat cushion 1 and a switching means 4 able to abut against the movable members 8, 51 and 231 are provided, performing occupant detection based on the on/off operation of the switching means 4 by means of the movement operation of the movable members 8, 51 and 231 accompanying a fall of the seat cushion 1.

11 Claims, 11 Drawing Sheets

SEAT STRUCTURE FOR VEHICLES WITH OCCUPANT DETECTOR

BACKGROUND OF THE INVENTION

The present invention relates to a seat structure for vehicles with an occupant detector for detecting an occupant when a seat is occupied.

As this type of occupant detector, there has conventionally been known an occupant detection device that is shown in Japanese Utility Model Laid Open (KOKAI) Publication No. 135843/1988. Such device has had a magnetic means which is provided in a seat for vehicles and moves up and down in accordance with the vertical movement of the entire seat and a magnetic detection means which is fixed to the floor of the vehicle for detecting changes in a magnitude of the magnetic field of the magnetic means when the seat is moved vertically. This device utilizes a principle that an amount of a fall in the entire seat due to a load exerted on the seat (someone sitting on the seat) is detected as a factor of magnetic field changes by means of the magnetic detection means, by which means occupant detection is performed.

However, with the above-described conventional device, since occupant detection is performed based on magnetic field changes, environmental changes such as temperature and the like are easily received and reliable occupant detection is difficult.

Also, in order to detect a fall or a downward movement of the entire seat, it is necessary to obtain reliable changes in a magnitude of the magnetic field. Thus, it becomes necessary that the down stroke of the entire seat must be amplified great in size in order to provide reliable magnetic field changes, as a result of which an uncomfortable feeling may be incurred to the passenger when the seat is occupied.

To this end, although an urging member is required to raise the entire seat when no one is seated, the set load of the urging member must be made large and accordingly the load necessary to lower the seat becomes large and as a result it may become difficult to detect light occupants in weight.

SUMMARY OF THE INVENTION

Therefore, it is an object of the present invention to provide a seat structure having an occupant detector which can perform more reliable occupant detection with smaller strokes of a seat cushion of the seat structure.

According to the present invention, there is provided a seat structure including a movable member, disposed between a seat cushion and a floor of a vehicle, for operating in response to an upward or downward movement of the seat cushion, one or a plurality of urging members for urging the movable member in one direction and urging the seat cushion in a rising direction, and switching means able to abut against the movable member by means of an operation of the moveable member, on/off state of the switching means being selected by operation of the movable member against an urging force of the urging members accompanying a fall of the seat cushion against an urging force of the urging members to thereby perform occupant detection.

According to the above seat structure, occupant detection is carried out based on the on/off operation of the switching means by way of the operation of the movable member accompanying a down movement of the seat cushion. Thereby, compared to the prior art, the effect of environmental changes such as temperature and the like are not easily received and more reliable occupant detection can be performed. Also, reliable occupant detection can be performed even with small down stroke of the seat cushion, and the uncomfortable feeling when sitting can be eliminated. Further, the seat cushion may be raised prior to seating, and in the case there is one urging member, the set load of the urging member can be reduced.

BRIEF DESCRIPTION OF THE DRAWINGS

These and other features, aspects and advantages of the present invention will become better understood with reference to the following description, appended claims and accompanying drawings, wherein:

DESCRIPTION OF THE PREFERRED EMBODIMENTS

A first embodiment of the present invention will now be described with reference to FIGS. 1–3.

Figure 1:
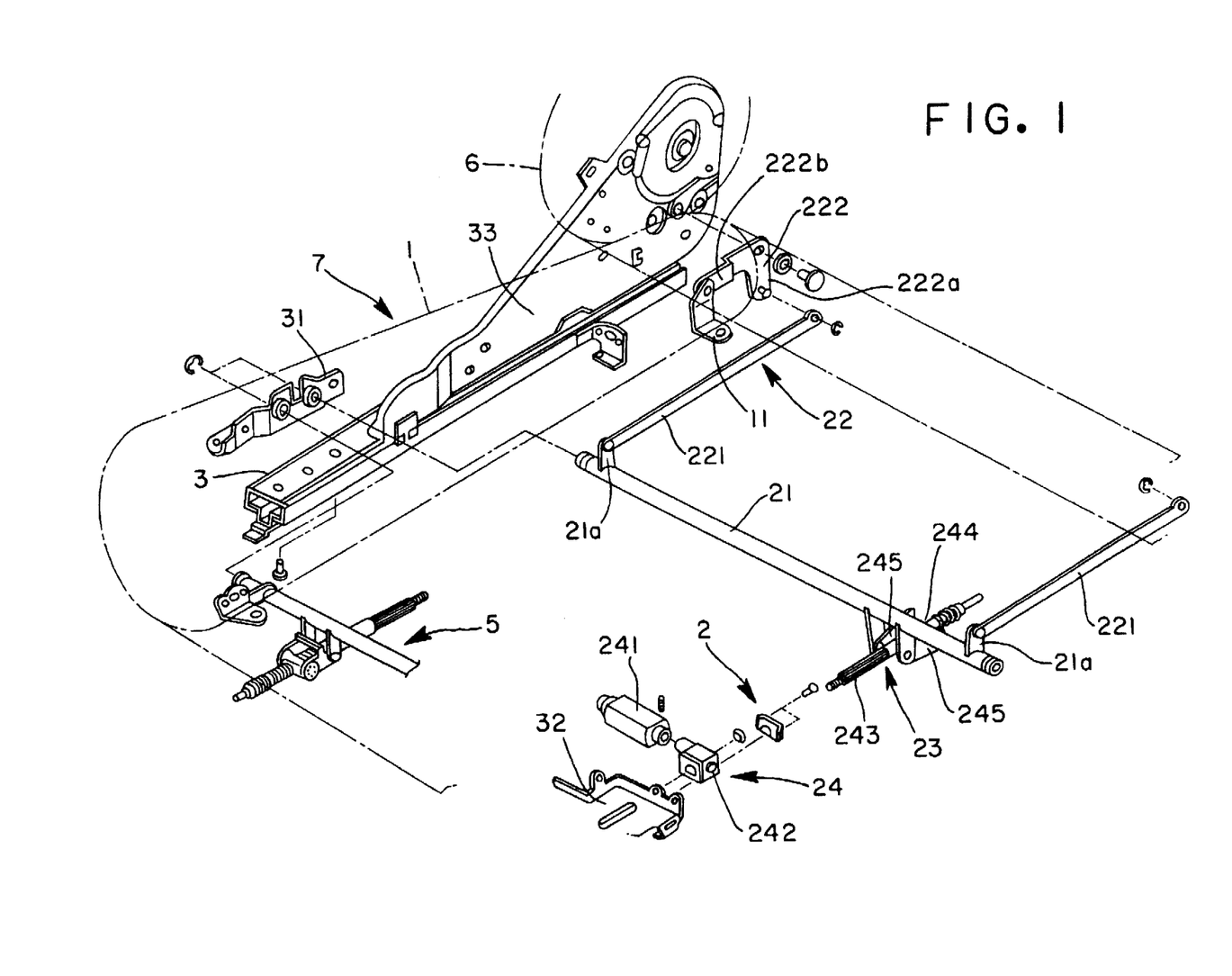
FIG. 1 is an exploded perspective view showing a first embodiment wherein the occupant detection device is incorporated in a vertical mechanism and employed in a vehicle seat structure.

A seat structure includes a pair of lower rails arranged to be fixed on a vehicle floor and a pair of upper rails 3 slidably arranged with respect to the lower rails (illustrating only rails for one side of a vehicle seat 7 in FIG. 1). The upper rails 3 support a seat cushion 1 of the vehicle seat 7 and each upper rail 3 has a bracket 31 which rotatably supports an end of rotatable shaft 21 and a lower arm 33 for supporting a seat back 6.

The seat structure as indicated in FIG. 1 has a rear vertical mechanism 2 for controlling the height of the rear side of the seat cushion. The rear vertical mechanism 2 has a seating detector. A driving member 24 for rotation of the rotatable shaft 21 comprises an electric motor 241 mounted on the upper rail 3 by means of a bracket 32, a reduction gear box 242 connected to the motor 241, a screw shaft 243 rotated by the motor 241, a movable nut 244 engaged with the screw shaft 241 and slidable along the screw shaft 241 in fore-and-aft direction, and a rotatable link 245 on which the nut 244 is pivoted and which is of generally U-shaped channel cross-section. The rotatable link 245 is connected to the rotatable shaft 21 through a driving link member 23.

A pair of connecting link members 22 are arranged on each side of the seat structure and each member 22 includes a bar 221 rotatably connected at one end to the rotatable shaft 21 and a bell crank link 222 (illustrating only one side in FIG. 1) rotatably connected to the lower arm 33. The other end of the bar 221 is rotatably connected to an arm 222a of the bell crank link 222. A bracket 11 (illustrating only one side in FIG. 1) is pivoted on another arm 222b of the bell crank link 222 and connected to the rear portion of the seat cushion 1, so that the rotatable shaft 21 is connected to both rear sides of the seat cushion 1 through the connecting link members 22.

Figure 2:
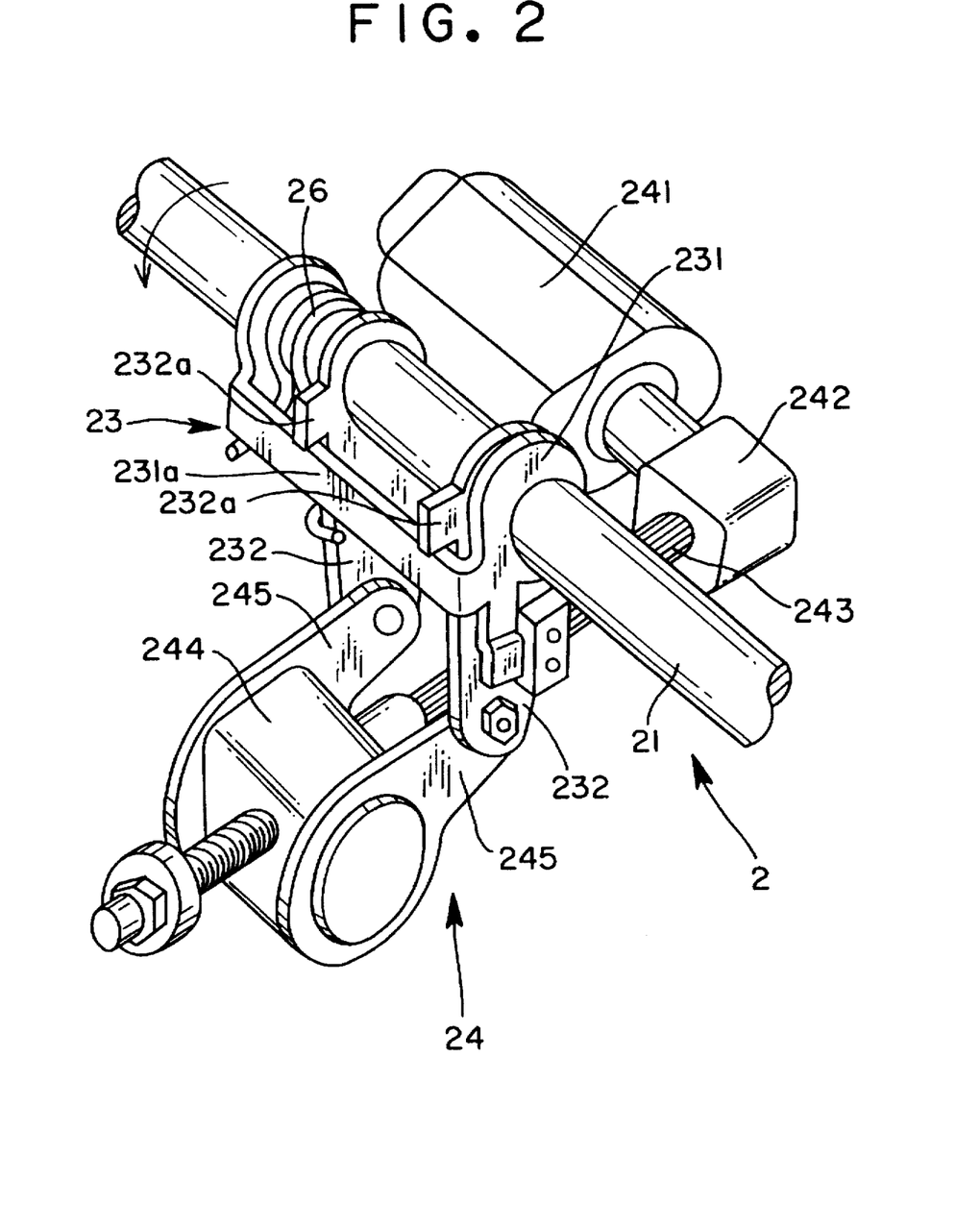
FIG. 2 is a perspective view showing the main components of the first embodiment.
Figure 3:
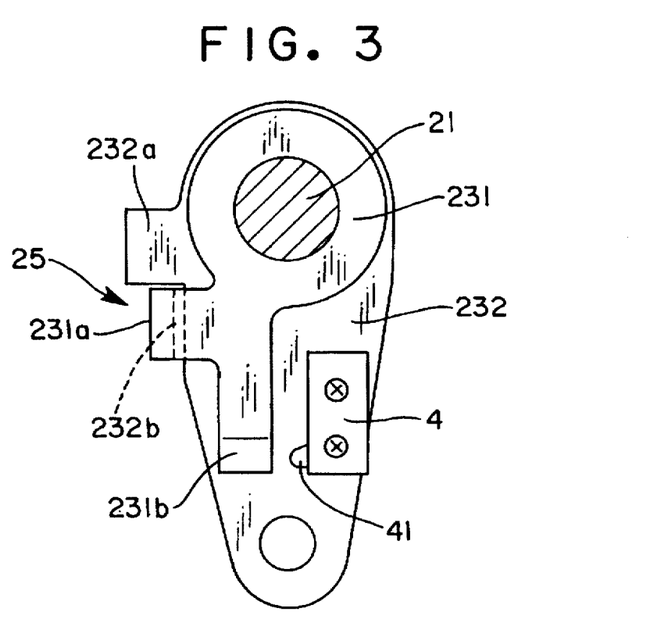
FIG. 3 is a side view of FIG. 2.

Referring to FIGS. 2 and 3, the driving link member 23 includes a pair of first links 231 secured to the rotatable shaft 21 and a pair of second links 232 rotatably mounted on the rotatable shaft 21. The links 232 are pivotally connected to the tip ends of the rotatable links 245. The first links 231 are integrally connected by a horizontal arm 231a and the second links 232 are provided with arms 232a, respectively in a fashion that these arms 232a, 232a are normal to the longitudinal portion of the arm 231a and when the second links 232 are rotated clockwise (in FIG. 3), side surface 232b of the second link 232 is abutted on the horizontal arm 232a. The arms 232a of the second link 232 are abutted on the horizontal arm 231a for the first links 231 when the links 232 are rotated counter-clockwise (in FIG. 3). As a result, clockwise or counter-clockwise rotation of the second links 232 can be transferred to the first links 231. A spring 26 is disposed between one of the first links 231 and one of the second links 232 and wound around the rotatable shaft 21. One end of the spring 26 is engaged with the first link 231 and the other end thereof is engaged with the second link 232 so that the horizontal arm 231a is normally abutted on the arms 232a by the biasing force of the spring 26 and the rear portion of the seat cushion 1 is apt to be lifted up by the biasing force of the spring 26 through the first links 231, to rotatable shaft 21 and the connecting link members 22 (see FIG. 1).

One of the second links 232 is provided with a normal open type limit switch 4 which is normally in an off-state and has a movable contact 41 for making an on-state by depression thereof. The movable contact 41 is arranged to face the end 231b of the first link 231 and be depressed by the end 231b of the first link 231 when the second links 232 are rotated clockwise (in FIG. 3) and the side surfaces 232b are to be abutted on the horizontal arm 231a so as to be switched from the off-state to the on-state. Another type of a switch can be substituted for the limit switch 4. A Hall IC or the like may be used in place of the limit switch 4. The front portion of the seat cushion 1 is lifted up or down by a well known front vertical mechanism 5 (see FIG. 1).

When a person does not take the seat 7, the first links 231 are subjected to the biasing force of the spring 26 so that the limit switch 4 is in the off-state and the rear portion of the seat cushion 1 is lifted up or raised. When the seat 7 is occupied, the weight of a person who takes the seat causes the rear portion of the seat cushion 1 to be lifted down against the biasing force of the spring 26 through the connecting link member 22 and the rotatable shaft 21 to be rotated counter-clockwise (in FIG. 3). Thus, the end 231b of the first link 231 is brought into contact with the movable contact 41 of the limit switch 4 to make the on-state thereof and the seated condition is detected.

When the motor 241 is actuated and the screw shaft 243 is rotated in one direction under the seated condition, the movable nut 244 is moved rightward (in FIG. 1) along the screw shaft 243 and the second links 232 are rotated clockwise (in FIG. 3) through the rotatable links 245. As a result, the side surfaces 232b of the second links are abutted on the horizontal arm 231a and the first links 231 are rotated clockwise (in FIG. 3). The rotation of the first links 231 causes the rotatable shaft 21 to be rotated clockwise (in FIG. 3) and the rear portion of the seat cushion 1 to be lifted up. When the screw shaft 243 is rotated in the other direction by the motor under the seated condition, the movable nut 244 is moved along the screw shaft 243 leftward (in FIG. 1) so that the second links 232 are rotated counter-clockwise (in FIG. 3) and the first links 231 is rotated counter-clockwise (in FIG. 3) by engagement of the arms 232a and the horizontal arm 231a. The rotation of the first links 231 causes the rotatable shaft 21 to be rotated clockwise (in FIG. 3) and the rear portion of the seat cushion 1 to be lifted down. During this operation, since the abutment of the movable contact 41 and the end 231b of the first link 231 is maintained by engagement of the arms 231a and 232a, the on-state of the limit switch 4 is kept.

In addition of the rear vertical mechanism 2 having the limit switch 4 as the seating or occupant detector, the front vertical mechanism 5 having the seating detector can be used. Alternatively, the seating detector can be mounted only on the front vertical mechanism.

Figure 4:
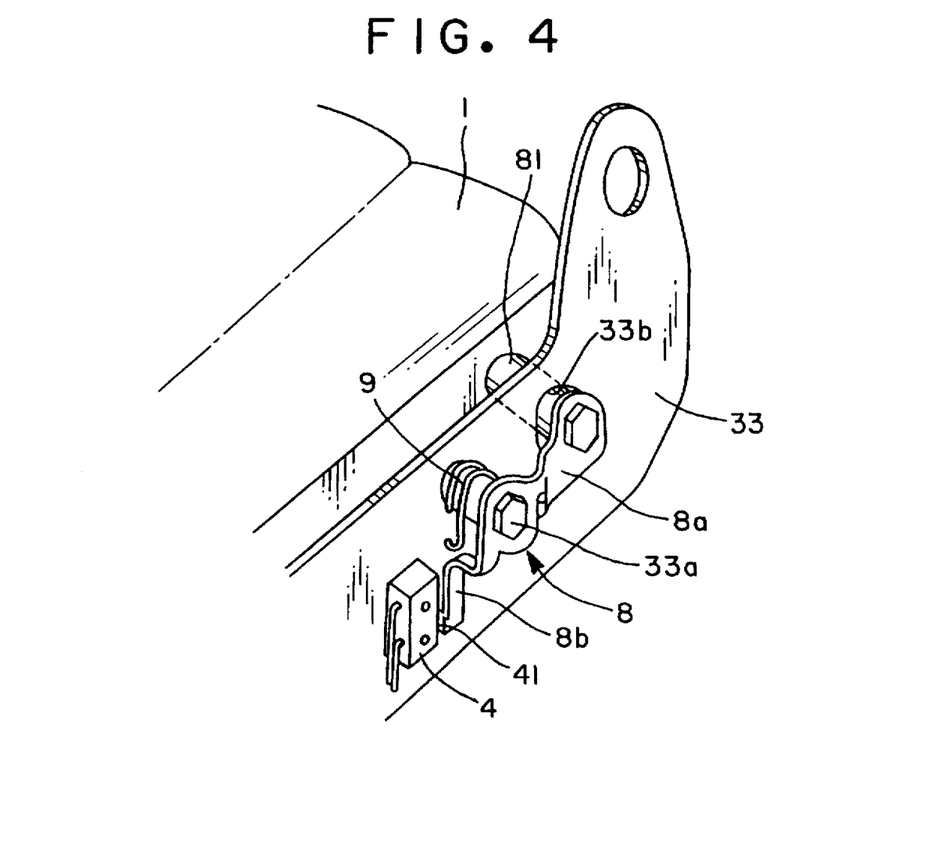
FIG. 4 is a perspective view showing a second embodiment wherein the seating detection device is directly applied to a vehicle seat structure.

FIG. 4 shows an example of an embodiment wherein the occupant detection device is directly incorporated and applied to a vehicle seat 7 (second embodiment).

As is shown in FIG. 4, a bell crank link 8 is rotatably supported by a pin 33a to the lower arm 33 or bracket 33 which is fixed to the upper rail 3. One arm 8a of this bell crank link 8 is connected via a slot 33b formed on the lower arm 33 to the rear side surface of the seat cushion 1 via a connecting pin 81. Also, this bell crank link 8 is continuously rotatably urged in the counter-clockwise direction of FIG. 4 by a spring 9 arranged around the pin 33a so that a pin 81 fixed to the one arm 8a abuts on the upper surface of the slot 33b and forms a gap between the lower surface thereof and the connecting pin 81. Thereby, the rear portion of the seat cushion 1 receives the urging force of the spring 9 via the bell crank link 8 and the pin 81 and is raised. Individual springs to rotatably urge the first links 231 and to raise the rear portion of the seat cushion 1 may be employed.

The limit switch 4 is fixed to the lower arm 33 of the upper rail 3. This limit switch 4 of on/off type is normally in an off rail 3 and is "normal open", which is an on state, by means of the operation of the movable contact 41, the movable contact 41 being disposed to abut against the other arm 8b of the bell crank link 8. This movable contact 41 abuts on the other arm 8b of the bell crank link 8 by rotation in the clockwise direction of FIG. 4 against the urging force of the spring 9 of the bell crank link 8 until the pin 81 of the bell crank link 8 abuts on the lower surface of the slot 33b and switches the limit switch 4 from an off state to an on state. A Hall IC or the like may be used in place of a limit switch 4.

The operation of the above embodiment will now be explained.

In FIG. 4, when a person is not seated on the vehicle seat 7, the limit switch 4 is in an off state due to rotational urging by the spring 9 of the bell crank link 8, and the seat cushion 1 is raised.

In this state, when a person is seated on the vehicle seat 7, at least the rear portion of the seat cushion 1 is moved downward against the urging force of the spring 9 due to this load, and the bell crank link 8 is rotated in the clockwise direction of FIG. 4 against the urging force of the spring 9 only by the distance of the previously described gap. Thereby, the movable contact 41 of the limit switch 4 abuts on the other arm 8b of the bell crank link 8 and reaches an on state. As a result, it is detected that a person has sat on the vehicle seat 7.

FIGS. 5 through 10 show a third example wherein the seating detection device is directly applied to a vehicle seat 7 (third embodiment).

Figure 5:
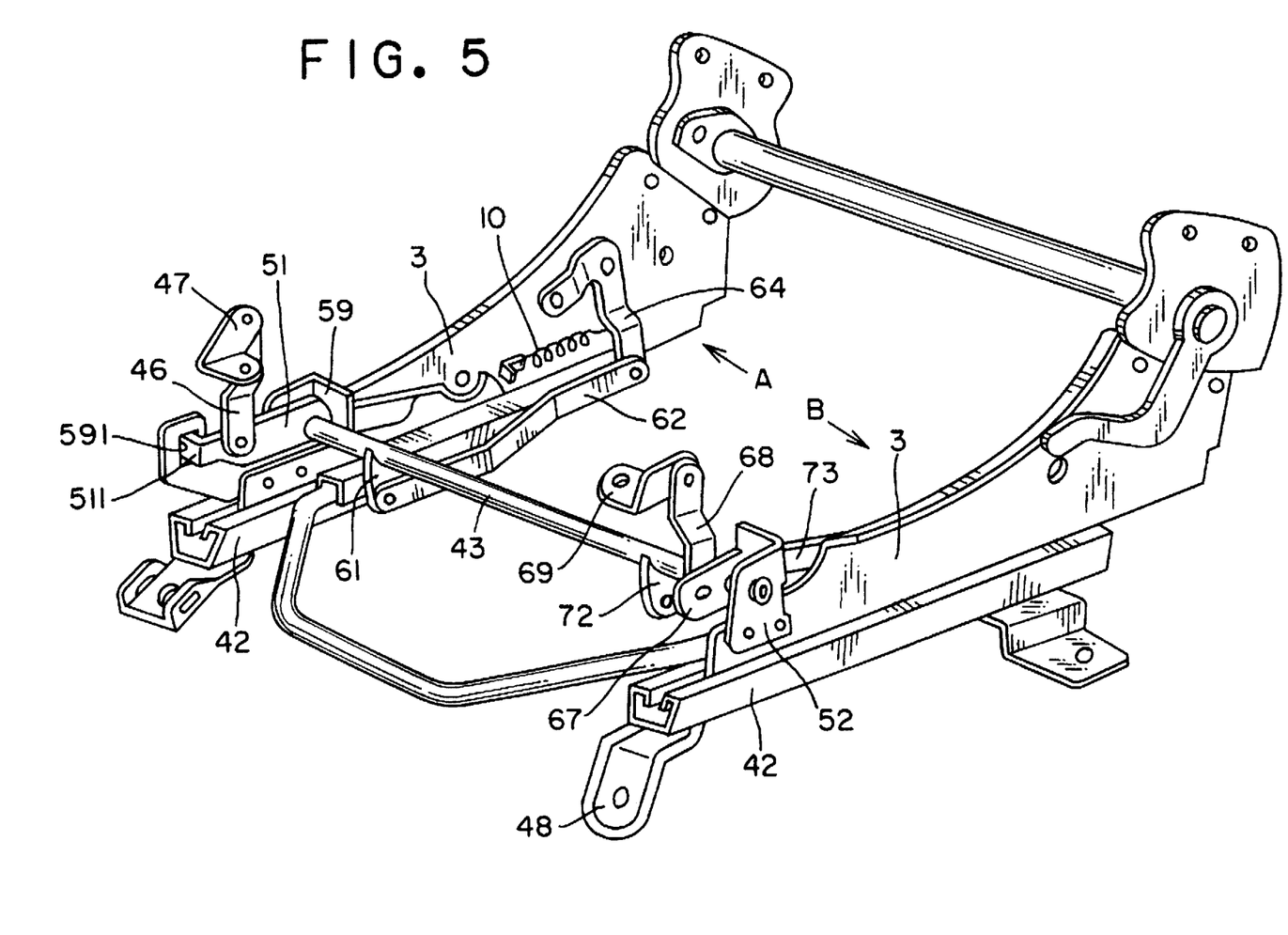
FIG. 5 is a perspective view showing a third embodiment wherein the seating detection device is directly applied to a vehicle seat structure.

As shown in FIG. 5, the rotating shaft 43 is rotatably supported by the pair of upper rails 3 at both ends via brackets 52 and 59 fixed in the upper rails 3, the upper rails 3 being movably supported in a fore and aft direction of the seat by a pair of lower rails 42 fixed to the vehicle floor (not shown) via brackets 48 at both ends in the fore-and-aft direction of the vehicle. A swinging link 51 is connected to a bracket or lower arm and is fixed to the rotating shaft 43 so as to rotate integrally therewith.

Figure 6:
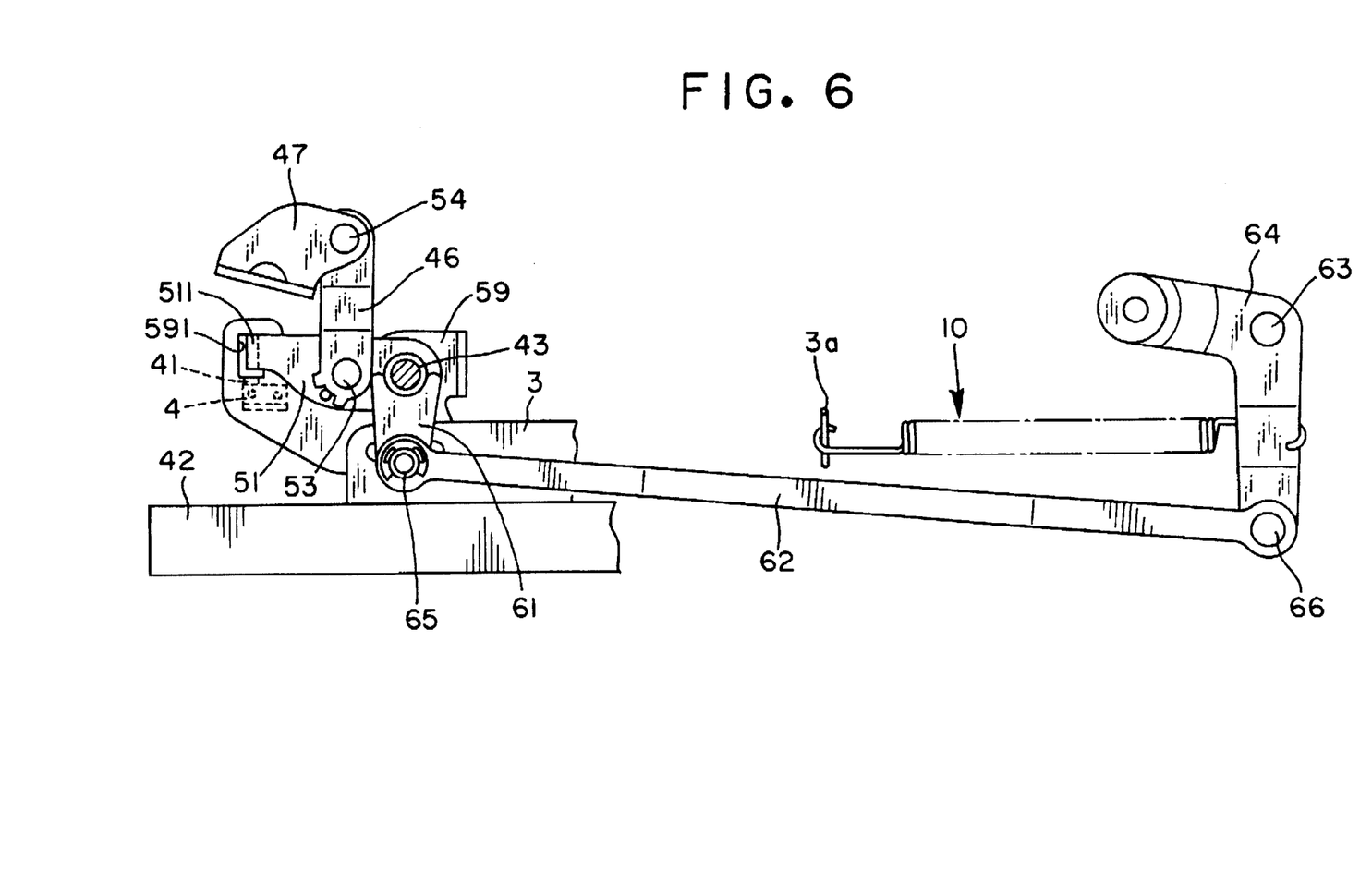
FIG. 6 is a side view of FIG. 5 along the direction A.
Figure 7:
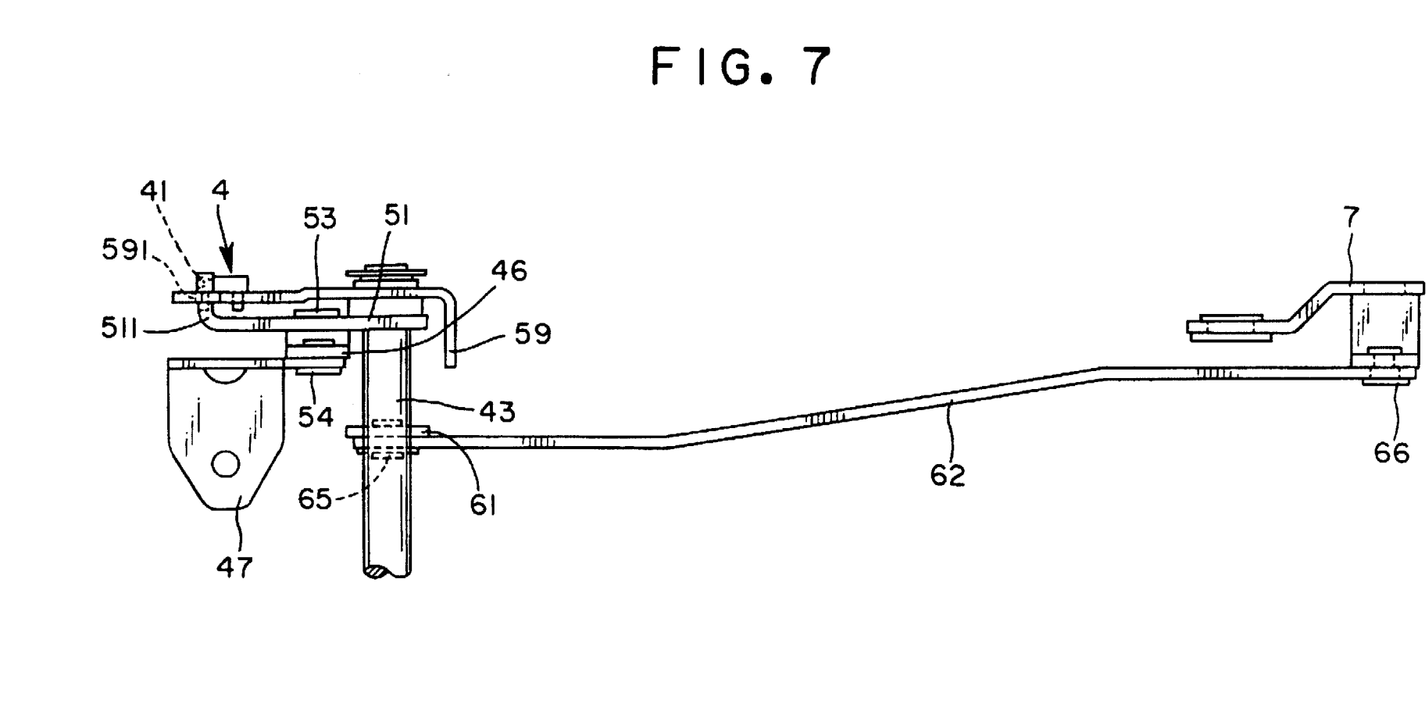
FIG. 7 is a top view of FIG. 6.
Figure 10:
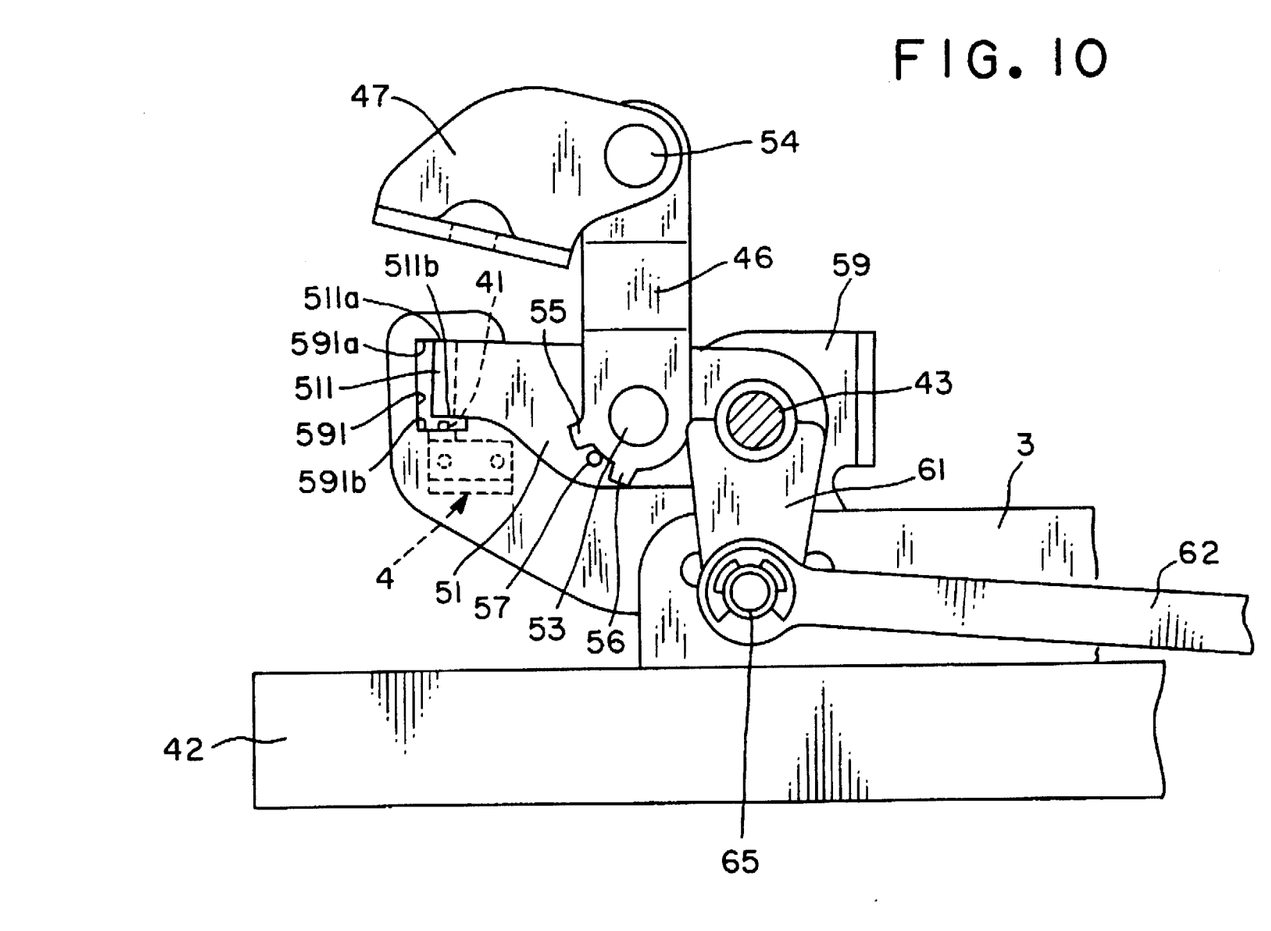
FIG. 10 is a plan view showing the main components of the third embodiment.

As shown in FIG. 6 and FIG. 7, a seat cushion attachment bracket 47 attached to one side of the front portion of the seat cushion 1 (see FIG. 1) is connected to a swinging link 51 via a support link 46. The seat cushion attachment bracket 47 is connected to one end of the support link 46 by a pin 54 and a washer, and the other end of the support link 46 is connected to the swinging link 51 by a pin 53. Also, as shown in FIG. 10, protruding portions 55 and 56 are formed on the other end of the support link 46. Meanwhile, a rotation control portion 57 protruding from the swinging link 51 is disposed between both the portions 55 and 56. This rotation control portion 57 is disposed so as to be able to abut on each of the protruding portions 55 and 56, whereby the rotation range of the support link 46 with respect to the swinging link 51 is regulated. This rotation control portion 57 and these protruding portions 55 and 56 of the support link 46 are not absolutely necessary. Further, an arm 61 is fixed in common with the bracket 59 to the rotation shaft 43 so as to rotate integrally therewith, and this arm 61 is rotatably supported by a pin 63 in the upper rail 3 via the connecting link 62 with one end is connected to the bell crank link 64 which is connected to one side of the rear portion of the seat cushion 1. The connecting link 62 is disposed substantially parallel to the upper rail 3, one end is rotatably connected to the arm 61 by a pin 65, and the other end is rotatably connected to the other end of the bell crank link 64 by a pin 66.

Figure 8:
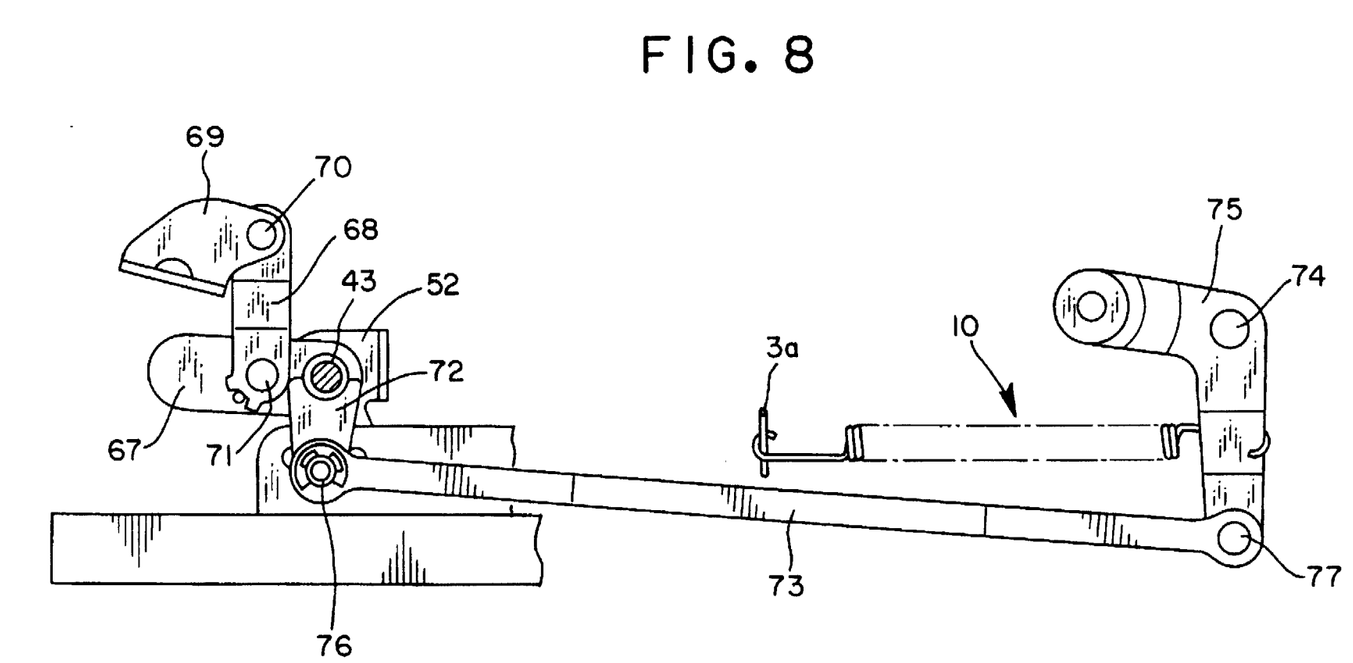
FIG. 8 is another side view of FIG. 5 along the direction B.
Figure 9:
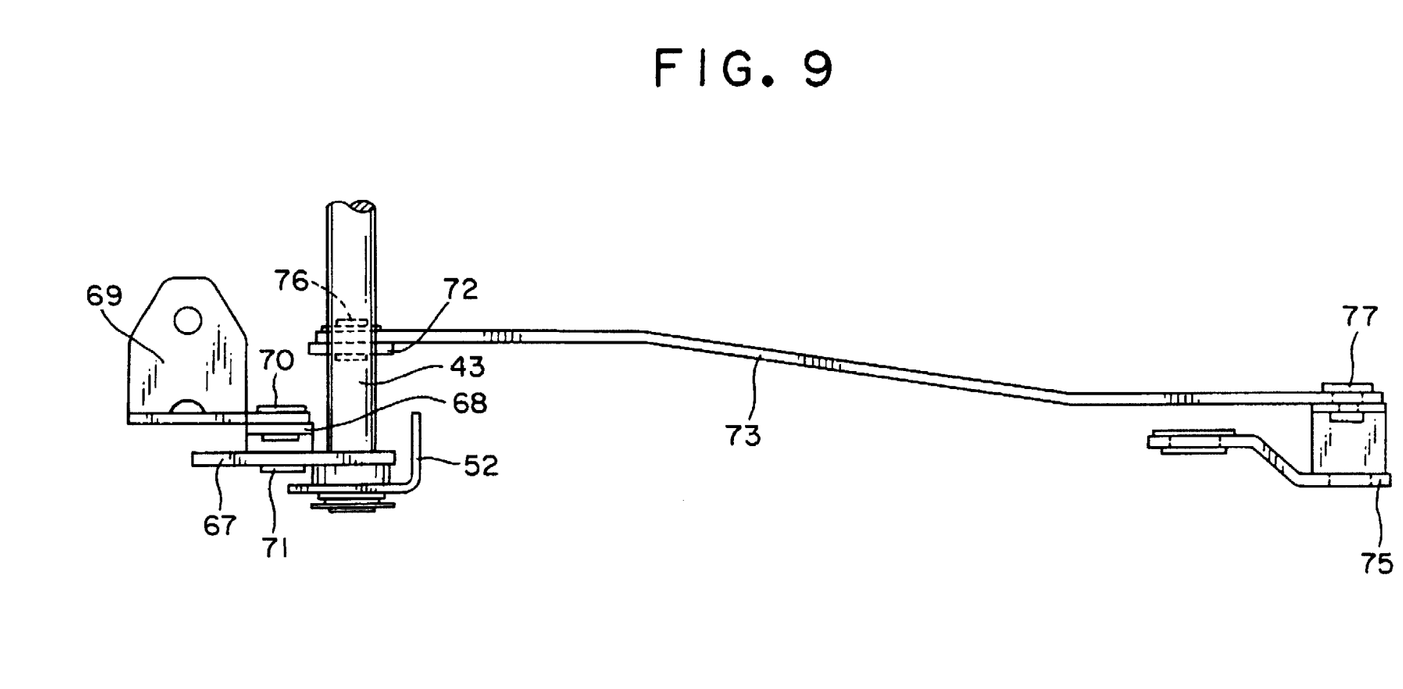
FIG. 9 is a top view of FIG. 8.

As shown in FIG. 8 and FIG. 9, a trailing link 67 is fixed to another end of the rotating shaft 43 in common with the brackets 52 (left side of the seat structure in FIG. 5) similarly to the swinging link 51 so as to rotate integrally therewith, and a seat cushion attachment bracket 69 is attached to one side of the front portion of the seat cushion 1 in the way in which the seat cushion attachment bracket 69 is connected to the trailing link 67 via a support link 68. The seat cushion attachment bracket 69 is connected by a washer to one end of the support link 68 by a pin 70, the other end of the support link 68 being connected to the swinging link 51 by a pin 71. Also, an arm 72 is fixed to the rotating shaft 43 in common with the brackets 52 similarly to the arm 61 so as to rotate integrally therewith, this arm 72 is rotatably supported at the upper rail 3 by a pin 74 via a connecting link 73 similarly to the connecting link 62, and one end thereof is connected to a bell crank link 75 similar to the bell crank link 64 connected to the other side of the rear portion of the seat cushion 1. The connecting link 73 is disposed substantially parallel to the upper rail 3 with one end being rotatably connected to the arm 72 by a pin 76 and the other end being rotatably connected to the other end of the bell crank link 75 by a pin 77.

As shown in FIGS. 5 and 10, a rectangular through hole 591 is formed in the bracket 59. A tip portion 511 of the swinging link 51 is bent toward the bracket 59 and inserted into the through hole 591 with appropriate gap, the upper and lower surfaces 511a and 511b thereof being able to abut the upper and lower wall portions 591a and 591b of the through hole 591. The rotation range of the swinging link 51 is thereby regulated.

As shown in FIG. 6 and FIG. 8, springs 10 are disposed between the bell crank links 64 and 75 and a stopper plate 3a of the upper rail 3, the bell crank links 64 and 75 receiving the urging force of the springs 10 and being continuously rotatably urged in the clockwise direction of FIG. 6 and FIG. 8. Thereby, the front portion of the seat cushion 1 receives the urging force of the springs 10 via the bell crank links 64 and 75, the connecting links 62 and 73, the arms 61 and 72, the swinging link 51, the trailing link 67, the support links 46 and 68 and the seat cushion attachment brackets 47 and 69, and is raised, while the rear portion of the seat cushion 1 receives the urging force of the springs 10 via the bell crank links 64 and 75 and is raised. At this time, the swinging link 51, as shown in FIG. 10, is continuously rotatably urged in the clockwise direction of FIG. 6 and FIG. 10 so that the upper surface 511a of the tip portion 511 abuts on the upper wall portion 591a of the through hole 591 and creates a gap between the lower surface 511b and the lower wall portion 591b.

As shown in FIG. 10, a limit switch 4 is fixed to the bracket 59. This limit switch 4 is continuously in an off state and is "normal open", which is an on state, by means of the operation of a movable contact 41, the movable contact 41 being disposed to abut against a tip portion 511 of the swinging link 51. This movable contact 41 abuts against the lower surface 511b of the tip portion 511 of the swinging link 51 due to rotation in the counter-clockwise direction in FIG. 6 and FIG. 10 of the swinging link 51 against the urging force of the spring 10 until the lower surface 511b of the tip portion 511 of the swinging link 51 abuts on the lower wall portion 591b of the through hole 591 of the bracket 59, changing the limit switch 4 from an off state to an on state.

The operation of the above embodiment will be explained.

In FIG. 5, when a person is not seated on the vehicle seat 7, the seat cushion 1 is raised by the rotational urging force of each link 51 and 67 by the spring 10, and the limit switch 4 is in an off state.

In this state, when a person is seated on the vehicle seat 7, the seat cushion 1 lifts down against the urging force of the spring 10 due to the person's weight. Thereby, the ends of the seat cushion attachment brackets 47 and 69 move downward, and the swinging link 51 is rotated in the counter-clockwise direction of FIG. 10 against the urging force of the spring 10 only by the distance of the previously described gap. As a result, the movable contact 41 of the limit switch 4 abuts on the lower surface 511b of the tip portion 511 of the swinging link 51 and reaches an on state. Thereby, it is detected that a person has been seated on the vehicle seat 7. At this time since the lower surface 511b of the tip portion 511 of the swinging link 51 abuts on the lower wall portion 591b of the through hole portion 591 of the bracket 59 and the rotation in the counter-clockwise direction of FIG. 10 against the urging force of the spring 10 is regulated, the drop of the seat cushion 1 is also regulated, whereby sinking of the seat cushion 1 beyond what is necessary is prevented. In this way, by the ends of the seat cushion attachment brackets 47 and 69 moving downward, the limit switch 4 is changed from an off state to an on state and it is detected that a person has sat on the vehicle seat 7.

therefore the load limit added to the seat cushion 1 to operate the limit switch 4 is substantially uniform across substantially the entire area of the seat cushion 1.

Figure 11:
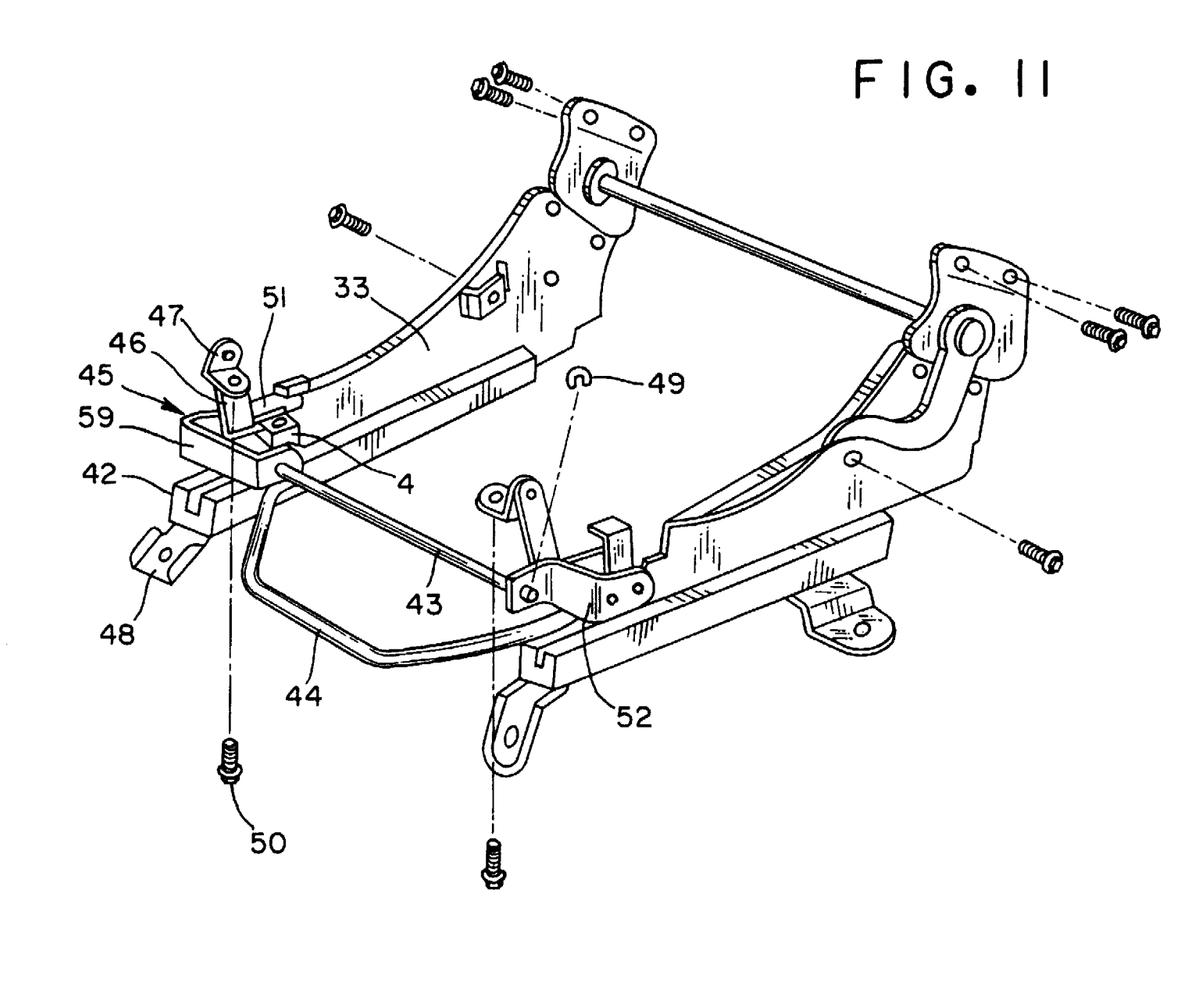
FIG. 11 is a perspective view showing a fourth embodiment wherein the seating detection device is directly applied to a vehicle seat structure.
Figure 12:
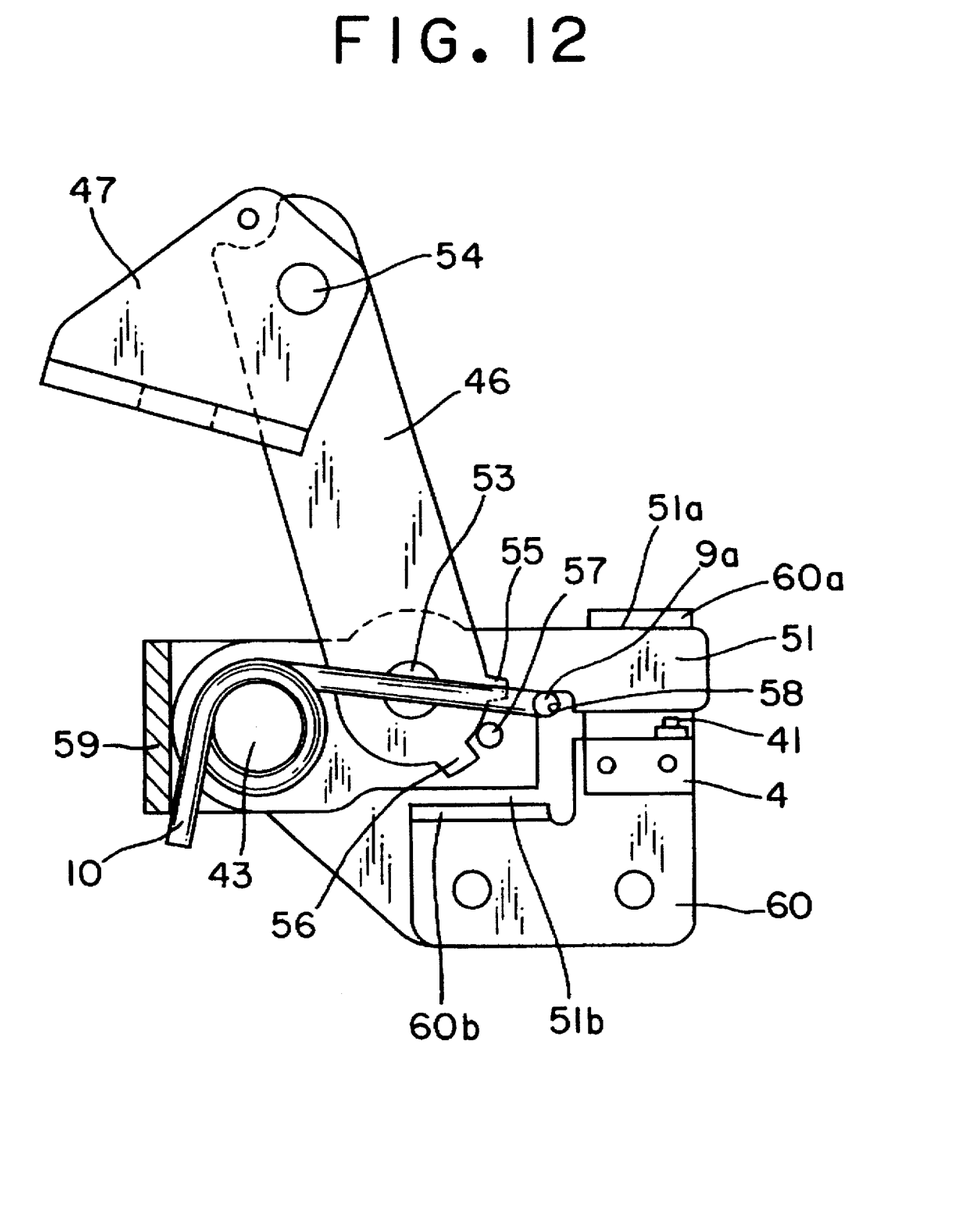
FIG. 12 is a plan view showing the main components of the fourth embodiment.

FIG. 11 and FIG. 12 show a third example of the seating detection device of the present invention applied directly to a vehicle seat 7 (fourth embodiment).

As shown in FIG. 11, the rotating shaft 43 is rotatably supported by a pair of upper rails 33 slidably in the fore-and-aft direction with respect to a pair of lower rails 42 fixed to the vehicle floor (not shown) via brackets 48 at both ends in the fore-and-aft direction of the vehicle, via brackets 52 and 59 fixed at both ends to the upper rails 33. A swinging link 51 is fixed to this rotating shaft 43 in common with the bracket 59 so as to rotate integrally therewith.

As shown in FIG. 12, a seat cushion attachment bracket 47 is connected to one end of the support link 46 by a pin 54 and a washer and the other end of the support link 46 is connected to the swinging link 51 by a pin 53. Also, protruding portions 55 and 56 are formed on the other end of the support link 46. Meanwhile, a rotation control portion 57 is formed protruding from the swinging link 51. This rotation control portion 57 is disposed between the protruding portions 55 and 56, whereby the rotation range of the support link 46 with respect to the swinging link 51 is regulated. This rotation control portion 57 and the support link 46 and the protruding portions 55 and 56 are not absolutely necessary.

As shown in FIG. 11, a bracket 52 is fixed to the rotating shaft 43 and similarly the swinging link 51 is fixed to the rotating shaft 43 so as to rotate integrally therewith, and the seat cushion attachment bracket 47 attached to the front portion of the seat cushion 1.

As shown in FIG. 12, a switch bracket 60 is fixed to the bracket 59. Control portions 60a and 60b are formed on the switch bracket 60. The swinging link 51 is disposed between the control portions 60a and 60b, and the side surfaces 51a and 51b thereof are able to abut on the control portions 60a and 60b. Thereby, the rotation range of the swinging link 51 is regulated.

A spring 10 is disposed between the swinging link 51 and the bracket 59 and wound around the rotating shaft 43. The spring 10 is engaged at one end with the bracket 59 and at the other end with a channel portion 9a of the swinging link 51, the swinging link 51 receiving the urging force of the spring 10 and being continuously rotatably urged in the counter-clockwise direction of FIG. 11 so that the side surface 51a abuts on the control portion 60a and a gap is formed between the side surface 51b and the control portion 60b. Thereby, the front portion of the seat cushion 1 receives the urging force of the spring 10 via the swinging link 51, rotating shaft 43, a pair of support links 46, a pair of seat cushion attachment bracket and a pair of seat cushions 47 and is raised.

A limit switch 4 is attached to the switch bracket 60. This limit switch 4 is normally in an off state and is placed in "normal open", which is an off state. The movable contact 41 is disposed to abut against a lower surface of the swinging link 51. This movable contact 41 abuts against the lower surface of the swinging link 51 due to rotation in the clockwise direction in FIG. 12 of the swinging link 51 against the urging force of the spring 10 until the side surface 51b of the swinging link 51 abuts on the control portion 60b of the switch bracket 60, changing the limit switch 4 from an off state to an on state.

The operation of the above embodiment will be explained.

In FIG. 12, when a person is not seated on the vehicle seat 7, the seat cushion 1 is raised by the rotational urging force of the swinging link 51 by the spring 10, and the limit switch 4 is in an off state.

In this state, when a person sits on the vehicle seat 7, the seat cushion 1 lifts down against the urging force of the spring 10 due to this load. Thereby, the seat cushion attachment bracket 47 moves downward, and the swinging link 51 is rotated via the support link 47 and the rotating shaft 43 against the urging force of the spring 10 in the clockwise direction of FIG. 12 only by the previously described gap. As a result, the movable contact 41 of the limit switch 4 abuts on the lower surface of the swinging link 51 and reaches an on state. Thereby, it is detected that a person has sat on the vehicle seat 7. When the person takes the seat, the seat cushion mounting bracket 47 is moved downward and the swinging link 51 is turned clockwise (in FIG. 12) against the biasing force of the spring 10 through the support link 46 and the rotating shaft 43. Thus, the movable contact 41 of the limit switch 4 is brought into contact with the lower surface of the swinging link 51 to be in an on-state and the seat occupant to the seat 7 is detected.

According to the present invention, since a rotating member which moves in coordination with the up and down movement of the seat cushion and an abutable switching means are provided and seating detaction is performed based on the on/off operation of the switching means by way of a movement operation of the movable member accompanying a drop of the seat cushion, compared with the prior art, the effects of environmental changes such as temperature etc. are not easily received and seating detection can be more reliably performed with a simple structure. Also, since the on/off operation of the switching means is performed from a rising or lowering movement of the seat cushion, when there is one urging member the set load of the urging member which raises the seat cushion prior to seating, i.e. places it in a prior-to-seating state, can be decreased, whereby the set load which can be detected can be decreased (lighter subjects can be reliably detected compared to the prior art). Further, since seating detection is performed by the on/off operation of the switching means, the movement operation of the movable member is reduced compared to the prior art, and reliable seating detection can be performed with a smaller down stroke of the seat cushion compared to the prior art. Thereby, the uncomfortable feeling when sitting can be eliminated.

The present invention is not limited to the above-described embodiments and drawings and various modifications may be made thereto without departing from the scope of the invention.

What is claimed is:

1. A seat structure for vehicles comprising
   a movable member adapted to be secured on an axially slidable member which is comprised of a rail member of a vehicle and operated in response to vertical movement of a seat cushion;
   link means rotatably supported on the axially slidable member and rotated in response to movement of the movable member;
   at least one urging member for urging the link means and the movable member in one direction and urging the seat cushion in a rising direction through the movable member; and
   switching means secured to the link means and adapted to abut against a part of the link means, the switching means being on/off operated by operation of the movable member against an urging force of the urging member accompanying a fall of the seat cushion when the seat is occupied to thereby perform occupant detection.

2. The seat structure of claim 1, wherein the movable member includes a bell crank link rotatably supported at the rail member and connected to the seat cushion.

3. The seat structure of claim 1, wherein the link means includes a bracket which rotatably supports the movable member and to which the switching means is fixed, and a regulating portion which is formed on the bracket and abuts on the link means due to rotating movement of the movable member accompanying a fall of the seat cushion.

4. The seat structure of claim 3, wherein the switching means is a limit switch having a movable contact, and the link means abuts on the movable contact due to the rotating movement of the movable member accompanying a fall of the seat cushion.

5. A seat structure for vehicle comprising
a movable member, disposed between a seat cushion and a rail member of a vehicle, for operating in response to vertical movement of the seat cushion;
at least one urging member for urging the movable member in one direction and for urging the seat cushion in a rising direction; and
switching means able to abut against the movable member by way of operation of the movable member, the switching means being on/off operated by operation of the movable member against an urging force of the urging member accompanying a fall of the seat cushion when the seat is occupied to thereby perform occupant detection the movable member being a swinging link rotatably supported on the rail member of the vehicle, and having an operating member which connects the swinging link to both sides of a front portion and both sides of a rear portion of the seat cushion and rotates the swinging link.

6. A seat structure for vehicles comprising
a movable member, disposed between a seat cushion and a rail member of a vehicle, for operating in response to vertical movement of the seat cushion;
at least one urging member for urging the movable member in one direction and for urging the seat cushion in a rising direction; and
switching means able to abut against the movable member by way of operation of the movable member, the switching means being on/off operated by operation of the movable member against an urging force of the urging member accompanying a fall of the seat cushion when the seat is occupied to thereby perform occupant detection, the movable member being a first link disposed between the seat cushion and the vehicles's rail member and rotatably supported on a driving link member of a vertical mechanism for moving the seat cushion in an up and down direction with respect to the vehicle floor.

7. The seat structure of claim 6, wherein the vertical mechanism is formed having a rotating shaft rotatably supported at the rail member and connected to the seat cushion and in which the first link is fixed so as to integrally rotate, the driving link member being supported so as to be rotatable relative to the first link and the rotating shaft, and the vertical mechanism further comprising a second link connected to a driving link member, the urging member disposed between the first link and the second link, and an abutting member provided between the first link and the second link for transmitting the rotation of the first link to the second link.

8. The seating detection device of claim 7, further comprising a pair of connecting link members connecting the rotating shaft to both sides of the rear portion of the seat cushion.

9. A seat structure for vehicles comprising
a movable member adapted to be held with respect to an axially slidable member which is composed of a rail member of the vehicle and operated in response to a vertical movement of the seat cushion;
a link member rotatably supported on the axially slidable member and rotated in response to the movement of the movable member;
at least one urging member for urging the link member and the movable member in one direction and for urging a seat cushion in a rising direction through the movable member; and
switching means secured to the slidable member and able to abut against a part of the link member, the switching means being on/off operated by operation of the movable member against an urging force of the urging member accompanying a fall of the seat cushion when the seat is occupied to thereby perform occupant detection.

10. The seat structure of claim 9, wherein the link member is rotatably supported by way of a pin, the at least one urging member being arranged around the pin.

11. The seat structure of claim 9, wherein the link member includes an arm which constitutes said part of the link member against which abuts the switching means.

* * * * *